Aug. 2, 1966   F. I. MOLZHON   3,263,673
FURNACE HUMIDIFIER
Filed April 28, 1964

FRED I. MOLZHON
INVENTOR

BY *Wm T. Me⎯*
ATTORNEY

3,263,673
FURNACE HUMIDIFIER
Fred I. Molzhon, 1908 Highland Ave., Burlington, Iowa,
Filed Apr. 28, 1964, Ser. No. 363,098
3 Claims. (Cl. 126—113)

This invention pertains to humidifiers and more particularly to humidifiers to be used on hot air furnaces.

Heretofore humidifiers that have been used in connection with hot air furnace systems have introduced humidity into the flow of hot air from the furnace to the duct work. The humidification having been caused by humidifying the hot air in the furnace proper. The exhaust gases from the heating portion of the furnace have not been utilized for purposes of causing humidity to be introduced directly into the hot air system.

It is therefore an object of this invention to provide a furnace humidifier which will cause the exhaust gases of the furnace to aid humidification.

It is a further object of this invention to provide a furnace humidifier which will utilize the flow of air from the cold air portion of the furnace through the humidifier and into the hot air portion of the furnace.

It is a further object of this invention to provide a furnace humidifier which will provide economy in the operation of the furnace and be efficient in the introduction of humidity into the hot air system.

Figure 1:
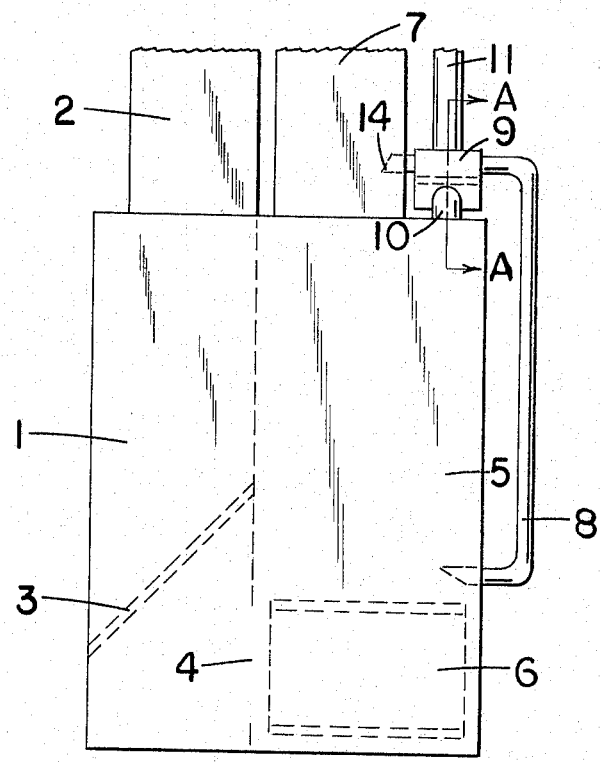
Figure 2:
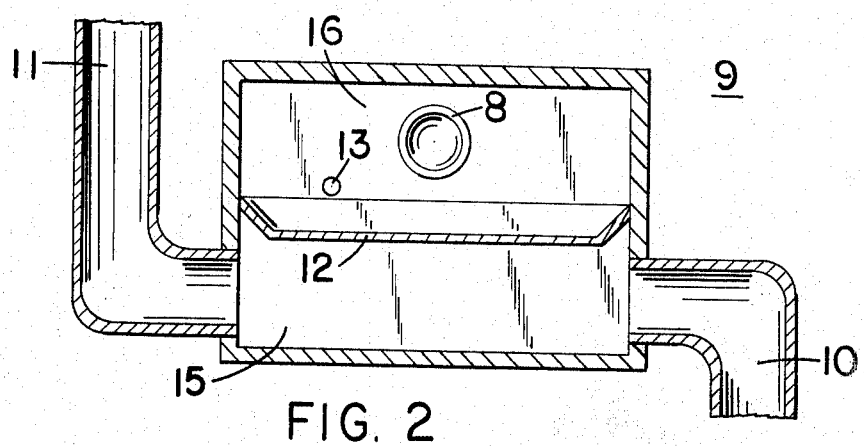

Further objects and advantages of this invention will become apparent from the following drawings, descriptions and claims:

In the drawings FIG. 1 is a diagrammatic view showing the structure of the hot air furnace with the humidifier attached thereto. FIG. 2 is a sectional view taken on section lines A—A through the humidifier.

In FIG. 1 cold air enters the furnace 1 through the cold air duct 2. The cold air flows down through the filter 3 and through the opening 4 into the heating chamber 5 of the furnace 1. A blower 6 forces air into the hot air duct 7 which carries hot air through smaller ducts to the various hot air registers throughout the building to be heated. A bleeder line 8 scoops air from the heating chamber 5 and introduces it into the humidifier 9. Exhaust fumes from the fire box of the furnace 1 escape through exhaust pipe 10 and are passed through the lower chamber 15 of the humidifier 9 and out the stack 11. Water is introduced into the pan 12 by means of the pipe 13. The high humidity pipe 14 carries humidified air from the humidifier 9 to the hot air duct 7. The pan 12 is fastened to the side of the humidifier 9 in such a manner as to completely isolate the lower chamber 15 of the humidifier 9 from the upper chamber 16 of the humidifier 9. This is obviously done so that the exhaust fumes flowing through the lower chamber 15 do not become introduced into the hot air system of the furnace 1.

The principle here involved thus uses the bleeder line 8 to pick up air from the heating chamber 5 and pass it over the pan 12. The hot exhaust gases passing through the lower chamber 15 of the humidifier 9 will heat the water in the pan 12 and cause the evaporation of water into the air forced through the bleeder line 8. This high humidity content air will be forced on into the hot air duct 7 greatly increasing the humidity of the air in the hot air duct 7.

Controls for increasing or decreasing the amount of humidity introduced in the hot air duct 7 may be used such as controlling the flow of water through the water pipe 13 into the pan 12. A further control may be the introduction of an electrical drain valve connected to the pan 12. These controls, however, are not shown for the reason that they do not form a part of this invention.

Further the pan 12 may have various shapes for the purpose of greater heat transfer to the water. These various shapes are not shown for the reason that they do not form a part of this invention.

It is thus seen that by the use of the furnace humidifier 9 as explained above humidity can be introduced into the hot air duct 7 on a high level using the exhaust fumes of the furnace 1 to advantage and thus increasing the efficiency of the furnace.

I claim:

1. For use in a furnace having a cold and hot air distribution system and a fire box with an exhaust duct connected thereto for heating the air in said system, a humidifier comprising an enclosure having top, bottom and side walls, a shallow pan sealingly engaging the side walls of said enclosure to divide said enclosure into an upper chamber and a lower chamber, said pan being open to expose water therein directly to air in said upper chamber, means for admitting water into said pan in said upper chamber, an inlet port in said lower chamber adapted to be connected to said exhaust duct, an outlet port in said lower chamber adapted for connection to said exhaust duct to discharge exhaust gases from said lower chamber into said exhaust duct downstream from the inlet port connection thereto, first air conveying means connected to one side of said upper chamber and adapted for connection with said hot air distribution system near said fire box to convey heated air therefrom into said upper chamber, and second air conveying means connected to the side of said upper chamber opposite to said first air conveying means, said second air conveying means being adapted for connection to said hot air distribution system downstream from said first means connection and remote from said fire box to convey humidified air from said upper chamber.

2. In combination with a hot air heating system which includes a fire box and an exhaust duct connected thereto and a cold and a hot air distribution system through which air is circulated and heated by said fire box and distributed, a humidifier for increasing the humidity of the heated air distributed through said system, said humidifier comprising walls forming an enclosed chamber, a water pan in said enclosed chamber, first air conveying means connected to said chamber and connected to said hot air distribution system near said fire box to convey heated air therefrom to said chamber, second air conveying means connected to said chamber opposite said first air conveying means and connected to said hot air distribution system downstream from said first means connection and remote from said fire box to discharge humidified air from said chamber into said hot air distribution system, means for admitting water into said pan, and means providing for the circulation of exhaust gases from said exhaust duct in contact with the walls of said enclosed chamber to heat water in said pan.

3. The combination of claim 2 in which said water pan divides said enclosure into an upper chamber and a lower chamber, said first and second air conveying means are connected to said upper chamber, and said exhaust duct is connected to said lower chamber to circulate exhaust gases therethrough.

References Cited by the Examiner
UNITED STATES PATENTS

| 1,453,137 | 4/1923 | Hockins | 126—113 |
| 2,139,429 | 12/1938 | Wilson | 126—113 |
| 2,860,228 | 11/1958 | Boyle et al. | 126—113 X |

CHARLES J. MYHRE, *Primary Examiner.*
FREDERICK L. MATTESON, Jr., *Examiner.*